(12) United States Patent
Hammond

(10) Patent No.: US 6,577,245 B2
(45) Date of Patent: Jun. 10, 2003

(54) WIRELESS ISOLATION RELAY FOR REMOTE METERING

(76) Inventor: Scott H. Hammond, 883 Cornelius Rd., Rockwall, TX (US) 75087

( * ) Notice: Subject to any disclaimer, the term of this patent is extended or adjusted under 35 U.S.C. 154(b) by 289 days.

(21) Appl. No.: 09/796,505

(22) Filed: Feb. 28, 2001

(65) Prior Publication Data

US 2002/0118119 A1 Aug. 29, 2002

(51) Int. Cl.$^7$ .............................. G08B 23/00
(52) U.S. Cl. .............................. 340/870.02; 340/870.03
(58) Field of Search ............. 340/870.02, 870.03; 324/76.16, 76.39; 379/106.03; 702/188, 62; 370/335

(56) References Cited

U.S. PATENT DOCUMENTS

| | | | |
|---|---|---|---|
| 4,697,182 A | * | 9/1987 | Swanson ............... 340/870.02 |
| 4,833,618 A | | 5/1989 | Verma |
| 5,053,766 A | * | 10/1991 | Ruiz-del-Portal et al. ............... 340/870.02 |
| 5,767,790 A | | 6/1998 | Jovellana |
| 5,874,903 A | | 2/1999 | Shuey |
| 6,100,817 A | | 8/2000 | Mason, Jr. |
| 6,124,806 A | | 9/2000 | Cunningham |
| 6,150,955 A | | 11/2000 | Tracy |

* cited by examiner

Primary Examiner—Michael Horabik
Assistant Examiner—Albert K. Wong
(74) Attorney, Agent, or Firm—Robert H. Frantz

(57) ABSTRACT

A meter unit, co-located to an electric meter, and a building unit, co-located with an energy management system, cooperate to deliver electric meter relay pulses from the electric meter to an energy management system via a wireless link. Meter relay pulses are input to the meter unit from the electric meter, relay states and pulse counts are transmitted to the building unit, and the states of the relays and pulses are regenerated by the building unit as outputs to the energy management system. The pulses output from the building unit perform as though they were created by the meter originally, but without the traditional wired connection. The system provides for error correction should a pulse count transmission be lost, as well as repeating of an end-of-interval pulse so that the energy management system may synchronize its data collection and operation to the measurements from the meter.

8 Claims, 4 Drawing Sheets

WIRELESS ISOLATION RELAY FOR REMOTE METERING

BACKGROUND OF THE INVENTION

It is commonplace today for industrial and commercial electric consumers to install energy management systems to record and analyze their electrical usage. At minimum, these systems allow the consumer to collect data over time related to the businesses power consumption which can later be analyzed in order to make adjustments to the facility to maximize power consumption efficiency and reduce power costs.

Energy management systems may include a demand controller to optimize the energy usage of a particular consumer, such as a factory, hotel, retail establishment, entertainment facility, or warehouse. A demand controller measures over time the power consumed by a business, and adjusts "run times" for short durations on certain electrical devices when the power load is too high by taking electrical equipment off-line. A demand controller is configured by consumer settings which includes a permissible maximum peak demand and a priority and order in which the controlled devices are to be turned off.

When the power consumption returns to an acceptable level, the demand controller will automatically allow the off-line equipment to turn back on. A demand controller typically uses complex mathematical formulae, sometimes performed on a realtime basis, with models of power usage built over time, to provide for the lowest peak demand charge.

For input regarding current energy usage, energy management systems typically collect three channels of energy related pulses from the consumer's electric meter. Usually, the electric meter is the meter installed by and owned by the electric utility company, and thus the consumer may have little or no choice in the model installed.

These usage pulses, commonly referred to as "KY" or "KYZ" pulses, are created by relay contacts within the meter. The relay contacts are operated by the meter to create pulses by alternately opening and closing the relays at a rate relative to the electrical usage at any given time. The summation of usage pulses over one hour could be the measurement of kilowatt-hours, in one instance. Other channels could be kilovar-hours (reactive energy), or others, in other configurations or other instances.

An end-of-interval ("EOI") pulse is also created, as well, in many cases, which allows the energy management system to synchronize its time period to that of the meter.

In the simplest method, these pulses are collected via cabling from the electric meter to the energy management system equipment. This is a practical solution when the electric meter is relatively close to the energy management system. However, in some applications, especially commercial facilities such as large grocery stores and home improvement centers, the meter is located with the pad mount distribution transformer across a back service parking lot, usually within 100 feet of the rear of the building. Installation of cabling from the building to the remote meter can often be a challenge, requiring digging up the parking lot to bury the 100 feet of cable from the meter location to the energy management system location. Alternatively, installing overhead wires in such an area which is usually heavily traveled by trucks to the rear side of a facility can be expensive and prone to damage.

Automatic Meter Reading ("AMR") is also well-known in the art. AMR consists of technologies and methods to remotely read a plurality of electric meters, such as a consumer base for an electric supplier company, into a billing database. Often times, these systems are designed for and intended for data collection by a service vehicle passing by the consumer's facility, or by a fixed data transmission means. For example, some AMR units consist of a collection unit attached to the consumer's electric meter, and a mobile receiver mounted in a service vehicle. As the vehicle passes near the electric meter, the receiver emits a signal to the collection unit, which causes the collection unit to transmit send its meter reading data to the receiver. This consumption data is then stored and later entered into a billing system. Another common type of AMR system uses a dial-up modem in the collection unit to dial a remote billing system and transmit its reading data via telephone lines. Still other variations of this theme include using data channels in wireless telephone systems to transmit usage data to a remote billing system via a wireless telephone network, such as PCS or cellular.

With currently available AMR systems, the wireless communications network not only is the data transport means, but also concentrates data from all electric meters on the network for a single feed to the utility billing computer. The KY, KYZ and EOI pulses from the originating meters are merely a universal means of transferring information from the meter to the AMR collection unit adjacent to the meter. But, the count or states of the pulses and relays are not actually transmitted to the billing system. As such, the consumption data from AMR collection units are usually in proprietary formats, and can only be received and decoded by a specific billing system.

Thus, the existing AMR remote meter reading systems are not suitable for use in transmitting meter relay states from the back of a facility pad to the energy management system owned by the consumer inside the consumer's facility. On the one hand, an AMR collection unit outputs are not compatible with the required KY, KYZ and EOI pulse inputs to typical energy management systems. On the other hand, even if the outputs of the AMR collection unit were compatible with the inputs of the energy management system, traditional AMR systems are not cost-effective for such an application whereas they are designed to distribute the costs of the AMR system of a large population of power consumers, not to be borne by a individual consumer.

Therefor, there is a need in the art for a system to communicate electric meter relay states and pulses from a first location of an electric meter to a second location of an energy management system. This system should be compatible with common KY, KYZ and EOI relay outputs of electric meters, and KY, KYZ and EOI relay inputs to energy management systems. Further this system should faithfully reproduce the states of the relays and pulses using an isolation technology which is reliable and error-free in order to allow for efficient management of the consumer's electric loads based on the usage data collected from the meter. Optimally, the system should use an isolation technology which is commonly available and is license-free.

SUMMARY OF THE INVENTION

The wireless isolation relay consists of two units: a meter unit and a building unit. The meter unit is co-located adjacent to the electric meter, and the building unit is mounted inside the consumer's building near a consumer's energy management system. The two units are interconnected using a wireless, license-free means such as RF (radio frequency). Meter relay pulses are input to the meter unit from the co-located meter, and relay states or counts are transmitted to the building unit system where the states of the relays (and pulses) are faithfully regenerated as outputs to the energy management system. The pulses output from the building unit perform as though they were created by the meter originally, but without the necessary wired connection. The circuitry of the transmitter could be implemented suitably for installation or integration within the electric meter housing as an original equipment option.

The disclosed preferred embodiment also provides for error correction should a pulse count transmission be lost or corrupted. Additionally, the preferred embodiment provides relay repeating for the end-of-interval pulse so that the energy management system may synchronize its data collection and operation to the measurements from the meter, just as if they were directly connected through traditional wiring means.

In contrast to available AMR technology, the invention uses a wireless means that remains local to the customer's premises and which is not part of a larger wireless network. Further, the meter pulse data is not concentrated with other meter data into proprietary usage data records, but are accurately repeated at the remote receiver so as to be useful and compatible with a consumer's energy management system. Thus, the data remains within the possession of the consumer, and the usage data is not input to a utility-owned billing system but rather to an energy management system owned by the consumer.

BRIEF DESCRIPTION OF THE DRAWINGS

The figures presented herein when taken in conjunction with the disclosure form a complete description of the invention.

DETAILED DESCRIPTION OF THE INVENTION

The following detailed description of the invention is presented relative to wireless isolation and relaying of meter data for an electric power consumption meter. It will be recognized, however, by those skilled in the art that similar problems with other types of utility meters such as water and natural gas meters exist, and that the invention can likewise be employed to solve the unfulfilled needs in the art.

Figure 1:
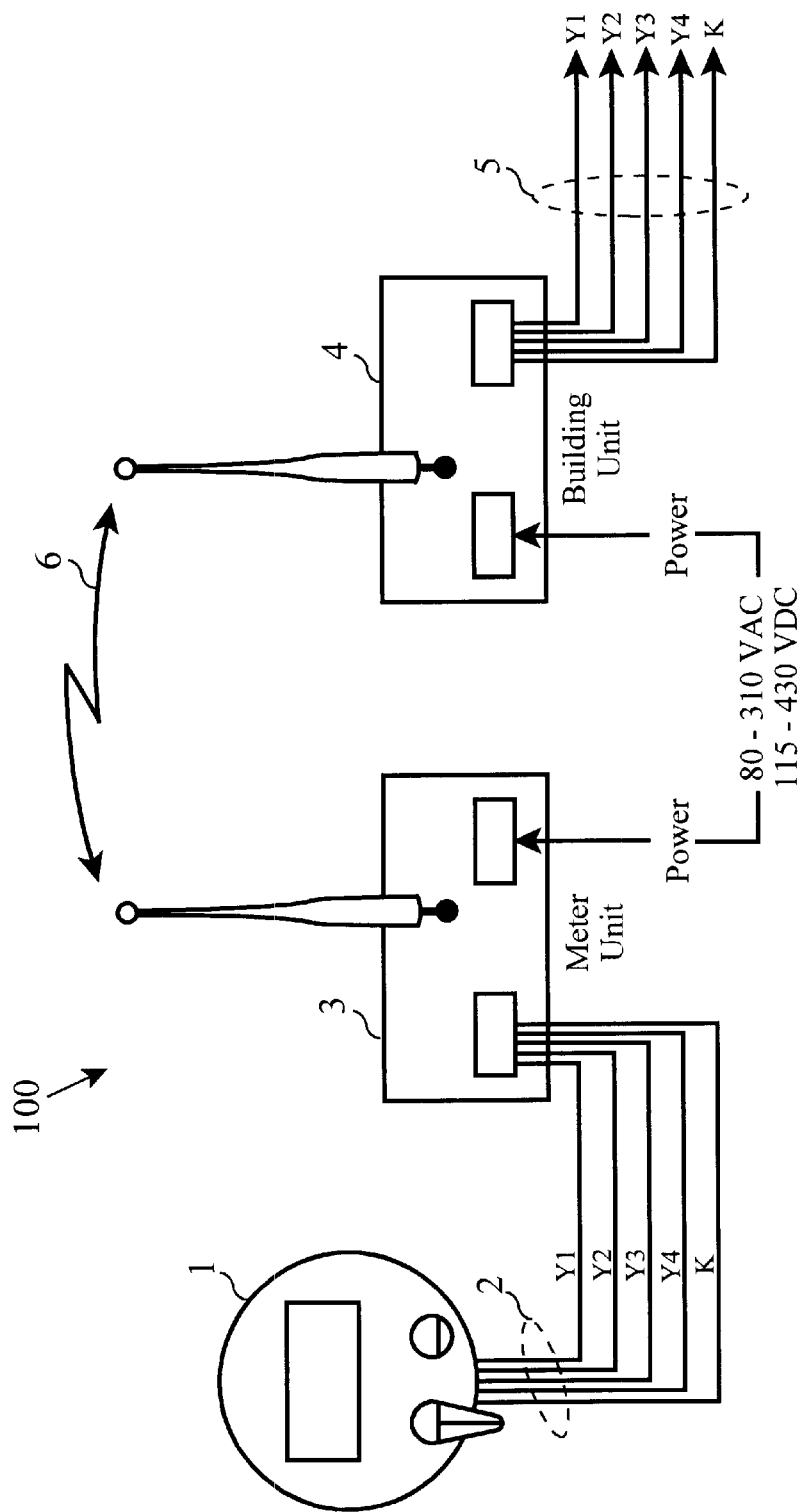
FIG. 1 shows the wireless isolation relay system in relation to an electric meter.

The wireless isolation relay (100) is implemented as a pair of units, a meter unit (3) and a building unit (4), as shown in FIG. 1. The meter unit (3) is co-located with the electric meter (1), and is receives as input the 4-channels, Form-A pulses (2) from the meter's relays. The meter unit (3) then transmits via a wireless medium a count of the KY and KYZ pulses, optionally with the EOI status, to the building unit (4). The building unit (4) is co-located with the energy management system, such as inside the consumer's facility or building. The building unit (4) replicates the pulses and relay status in the form of 4 channel, Form-A outputs such that the energy management system may receive meter data just as if it were directly connected to the meter.

Radios

According to the preferred embodiment, frequency hopping spread spectrum radios are used to minimize interference and for license free operation. These radios are preferably World Wireless Communications, Inc., (WWC) MicroHopper[TM] radios. These frequency-hopping data transceiver radio modules are designed for integration into other products. The MicroHopper[TM] radio modules are connected to host devices, such as a microcontroller as described later in the present invention, via common connector (a 20-pin dual in-line header). The connection to the radio module provides DC power to the radio as well as I/O lines for TTL controls and RS-232 port data communications. The MicroHopper[TM] of the preferred embodiment operates within the 900 MHz ISM Band, which is license free. The MicroHopper[TM] also employs spread spectrum technology, which allows secure and interference-immune communications between the two units of the invention. It will be recognized by those skilled in the art that alternate radio means can be employed without departing from the spirit and scope of the present invention.

Meter Unit

Figure 2:
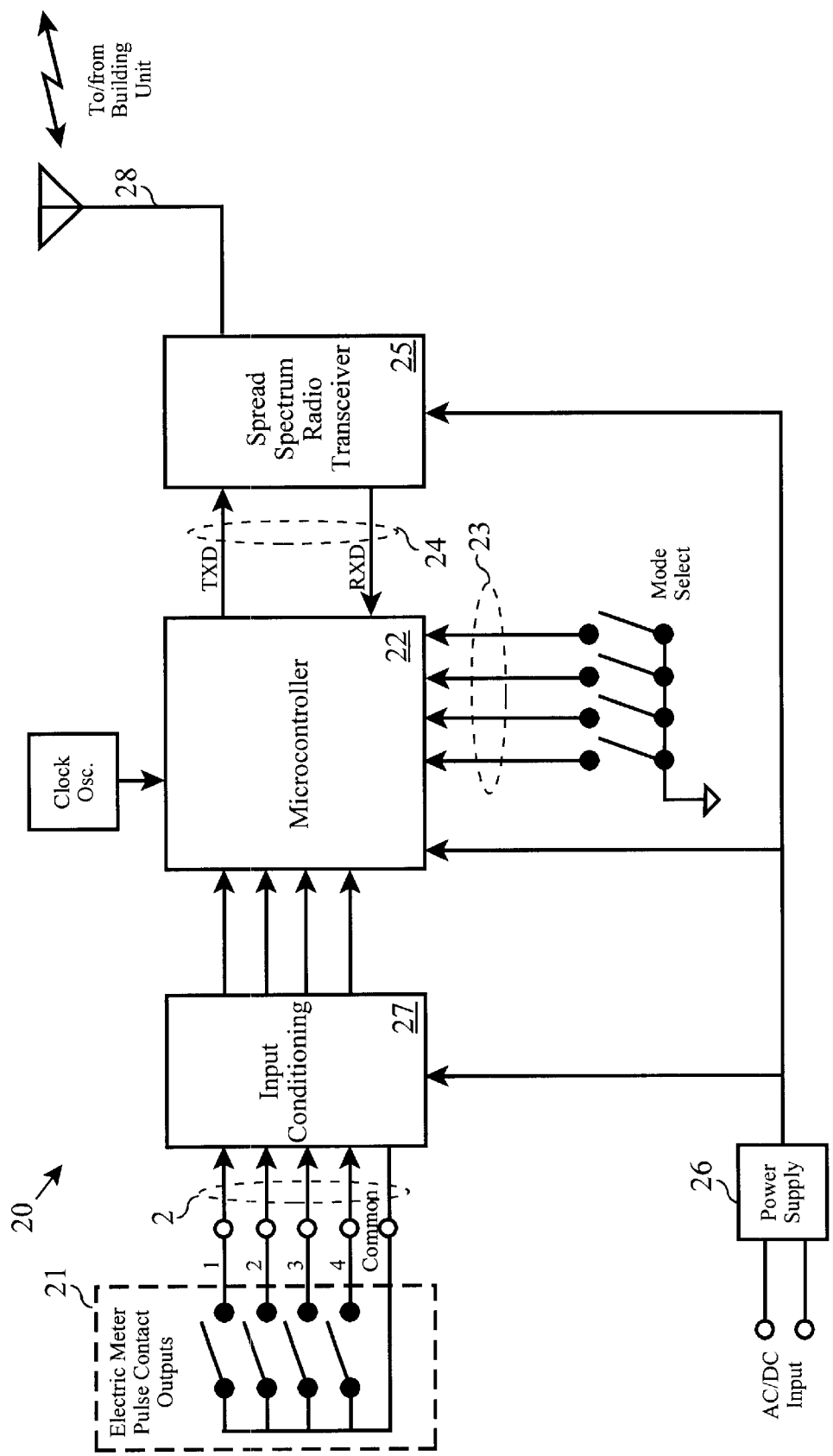
FIG. 2 is a block diagram of the meter unit.

The block diagram of the meter unit is shown in FIG. 2. The relay outputs is (21) from the meter (1) are cabled (2) to an input conditioning circuit (27), such as required pull-up resistors, pull-down resistors, current limiting resistors and surge protectors. The pulse inputs are compatible with 4 KY or 4 KZ signals, 5 VDC wetting voltage, at 10 mA.

The conditioned relay states are read by a microcontroller (22), which is provided with an internal or external clock or oscillator source. In the preferred embodiment, a PIC505 microcontroller, available from Microchip Semiconductors, is used. However, it will be recognized by those skilled in the art that many alternate suitable microcontrollers may be used.

The microcontroller is preferably provide with several installer-selectable mode switches (23), which is readable by the microcontroller firmware. The microcontroller also has RS-232 inputs and outputs (24) including a transmit data signal (TXD) to the radio module (25), and a receive data signal (RXD) from the radio module. The radio module (25) is preferably a WWC MicroHopper[TM] unit as described before, with a suitable antenna (28).

The meter unit (20) is also provided with a power supply (26), such as an AC to DC transformer or a battery. The power supply (26) is designed to accept AC voltages common to that of electric meters, such as 120V, 240V and 277V, without any additional equipment. The power supply can be configured for DC operation for applications where the wireless isolation relay (100) is installed at substations and operating at battery voltages of 24V, 48V, 125V or 250V.

Building Unit

Figure 3:
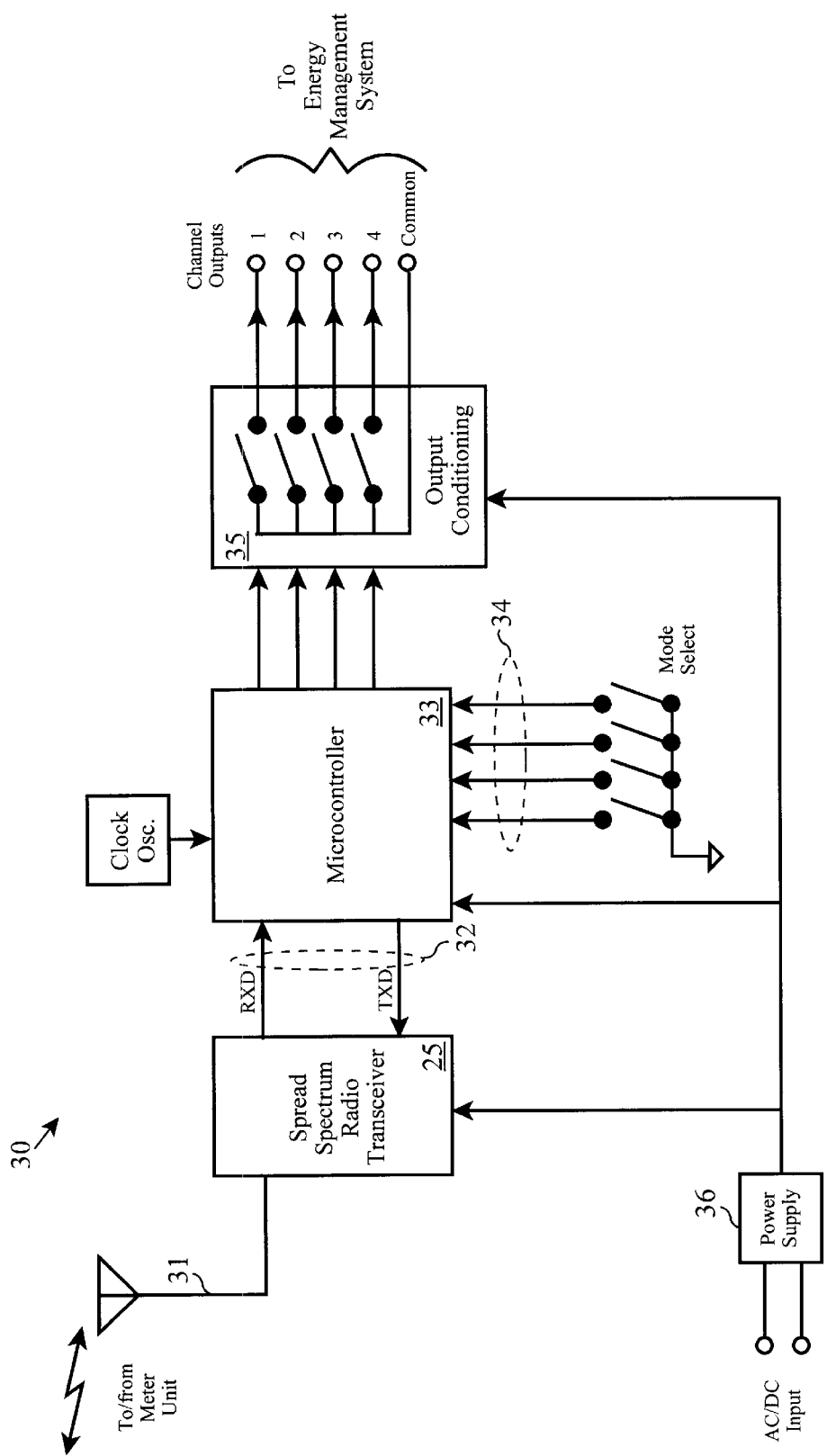
FIG. 3 is a block diagram of the building unit.

Turning to FIG. 3, the block diagram of the building unit is illustrated. The signal transmitted from the meter unit is received via a build unit antenna (31) by another radio module (25), preferably a WWC MicroHopper[TM] unit. The radio module data input TXD and output RXD (32) are communicated to the RS-232 port of the microcontroller (33), which is also preferably of the same manufacturer and model as employed in the meter unit. Similarly, the preferred embodiment calls for a set of installer-configurable mode switches or straps (34), which is readable by the microcontroller (33) firmware.

Finally, the microcontroller (33) outputs are used to control a set of relays (35) with output signal conditioning so as to replicate the meter relay outputs to an energy management system. The output relays are 4 Form-A solid state contacts with common K terminal. The contacts are rated at 240 VAC or 240 VDC, 100 mA maximum.

And, like the meter unit, a power supply (36) such as an AC to DC converter or battery is provided to power the building unit (30).

Communications and Operation

The wireless isolation relay system (100) preferably uses a polling scheme where the building unit, acting as a master, polls the meter unit for its pulse data. The pulse data is a count of pulses for each meter channel, not merely the current state of each input. Polling allows a more robust system in that communications is a closed loop between the meter unit and the building unit.

Further, with polling and an addressing scheme, multiple meter units can be supported by one building unit. Being a four-channel system, the user has the option of two meter units, each feeding two channels to one building unit, or even four meter units feeding one channel each to one building unit.

A benefit of programming all units via mode switches is that a building unit knows what to expect from each meter unit, and it can detect and report erroneous operation. Errors could include improper meter unit response, and no meter unit response. The communications protocol, described in detail later, preferably includes a bit-level error detection scheme, as well.

According to the preferred embodiment, the user can select one of three actions to be taken by the building unit after a loss of signal condition between it and a meter unit. This is a critical issue since each pulse ultimately corresponds to cost of electrical power. The three modes of operation are (a) basic mode, (b) catch-up mode, and (c) End-of-Interval mode.

In basic mode, after a loss of signal condition, the building unit does not generate output pulses to "catch-up" with missed meter unit transmissions, due to those missed during the signal loss. Instead, the building unit zeros the count from the meter unit, but then continues with the next count from the meter unit. The pulses transmitted during the loss of signal are essentially thrown away.

In catch-up mode, after a loss of signal condition, the building unit generates output pulses to the energy management system to catch-up or compensate for the count from the meter unit.

In End-of-Interval mode, one channel input by the meter unit is designated for EOI operation. After a loss of signal condition, the Receiver generates catch-up pulses as in the catch-up mode. If a complete cycle (high-low-high) has occurred on the meter unit EOI input during the loss of signal, then the building unit generates pulses as in the catchup mode but the pulses on each output channel are generated in sequence, relative to the EOI output, just as they were on the meter unit's inputs relative to the EOI input.

This requires an additional set of counts per channel and an EOI flag to be sent from the meter unit to the building unit. If the EOI flag is not set, operation is the same as catch-up mode. If the EOI flag is set (due to a cycle on the EOI input), the building unit generates the catch-up pulses on all output channels prior to the EOI input, cycles the EOI output (hi-lo-hi), then generates the balance of pulses to catch-up with the count from the meter unit.

In actual operation, an EOI count is used instead of an EOI flag, in case a loss of signal condition occurs during the recovery from a previous loss of signal condition.

EOI Mode is a method of preventing an artificially high peak demand due to a simultaneous occurrence of a loss of signal and an end of interval. In many applications (but not all), the pulses are recorded in 15 minute increments with the 15 minute period established by a sync (EOI) pulse from the electric meter. The EOI pulse commands the end-recording device to save the accumulated pulses and start counting again from zero for the next 15-minute period. In addition to summarizing all pulses to determine consumed kiloWatt-hours, the demand in kiloWatts is determined by the count per 15-minute interval. And the peak demand is determined by the largest count of any interval for the month. The catch-up process following a loss of signal crossing an interval boundary would result in pulses being applied to the wrong interval and possibly creating an artificially high peak demand measurement. By using the described EOI Mode, this is prevented.

The Mode Select switches (23 and 34) as shown in FIGS. 2 and 3 represent the user's choice in the number of transmitters, transmitter addresses, Test Mode operation and whether Basic Mode, Catch-up Mode or EOI Mode is to be used.

Figure 4:
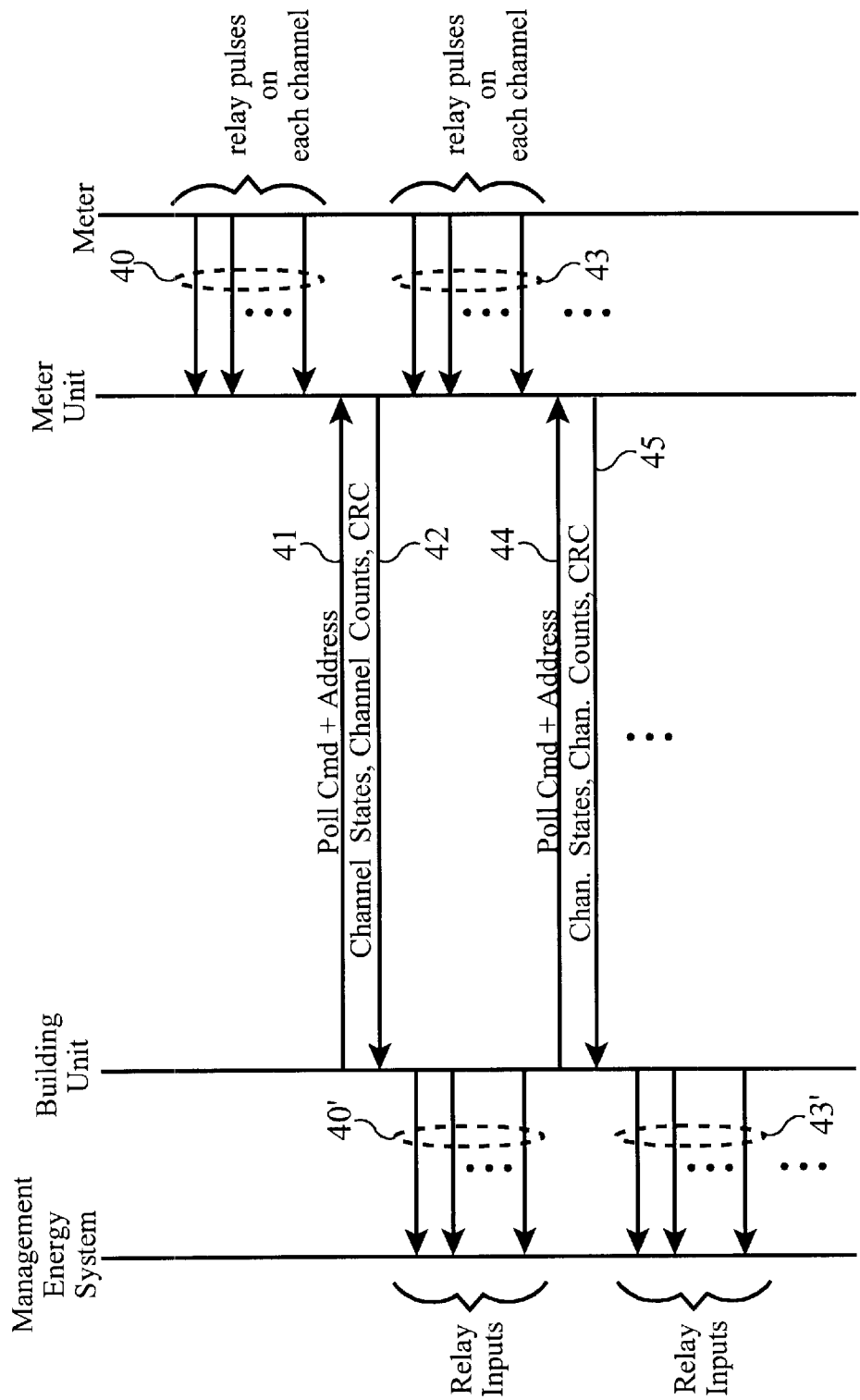
FIG. 4 illustrates the communications protocol and operations process of the invention.

Communications between the meter unit and the building unit are bi-directional according to the preferred embodiment, and as shown in FIG. 4. However, it will be recognized by those skilled in the art that a uni-direction, meter unit to building unit is communications scheme could be adopted without departing from the spirit and scope of the present invention. Both units, though, preferably include a wireless data transceiver, such as the WWW MicroHopper [TM] previously described.

While the meter unit receives relay state changes (40) on each channel from the meter, it integrates a count of pulses for each channel and keeps that count in memory. Each second, the building unit polls (41) the meter unit (or sequentially each meter unit one second at a time by address when multiple meter units are used) for the meter pulse count data. The pulse count data, including the logical state of each meter relay or channel, and the count or running total of pulses on each channel with an 8-bit capacity, is transmitted (42) by the addressed meter unit to the building unit.

With each poll response, the building unit compares each most recent channel count with each previous channel count, and the calculated difference is the number of output pulses (40') to be generated on the corresponding building unit output channel (to be received by the Energy Management system).

Then, the building unit waits one second and issues a poll command to each meter unit again (44). The meter unit responds by transmitting (45) the state of each channel relay with the running total count of pulses for each channel (43). Again, the building unit subtracts the new running total from the previous total for each channel, and outputs that number of pulses on the corresponding relay outputs to the energy management system (43'). This continues repetitively, as described.

With this protocol and process, even if the signal path is temporarily interrupted and some polls or poll responses are missed, the count received with the next successful poll is used with the last previous poll to determine the number of pulses to output, so no pulses are ultimately lost. This is the catch-up mode previously described in this disclosure.

The actual state of each input is also sent as part of the meter pulse count data to ensure the logical state of the building outputs stay in sync with the meter unit inputs.

As for real-time operation, the building unit polls the meter unit each second so the pulse count data could be as much as one second old. However, metering pulses are usually integrated over a 15 minute interval, so one second is effectively "real-time." With pulses entering the meter unit's input at a slow speed (corresponding to a low rate of electric consumption), many polls may pass with no state change on a particular channel. With a high input pulse rate (corresponding to a high rate of electric consumption), multiple changes of meter relay state can occur per poll which is resolved with the building unit toggling its output an equal number of times during the next poll period.

By using whip antennae and the suggested radio units, an isolation distance of up to 500 feet between the meter unit and the building unit can be reliably achieved. An isolation distance of up to 2 miles may be achieved using a pair of directional Yagi antennae. These isolation distances are adequate for communications across parking lots, fields and switchyards, thereby avoiding the necessary trenching to bury wires or is installation of overhead wires as seen in the current technology.

What is claimed is:

1. A wireless isolation relay system for communicating utility meter relay pulses from an electric meter to a recipient system such as an energy management system, said wireless isolation relay system comprising:

a meter unit disposed nearby or co-resident with a utility meter, said meter unit having at least one relay pulse channel input for receiving meter relay pulses via an electrical conductor from an electric meter, a counter for said relay pulse channel input, and a first radio adapted to transmit said meter relay pulse state and counter count; and a building unit disposed nearby or co-resident with a recipient system for meter relay pulses, said building unit having a second radio adapted to receive said transmitted meter relay pulse state and counter count, and a pulse generator for recreating meter relay pulses according to said received meter relay pulse state and count, said pulse generator having at least one output suitable for input to a recipient system.

2. The system as set forth in claim 1 further comprising a polling timer within said building unit such that responsive to expiration of said polling timer, a signal is sent by said building unit to initiate transmission of said meter relay pulse state and counter count.

3. The system as set forth in claim 2 further comprising an address generator within said building unit and an address recognizer within said meter unit such that upon expiration of said polling timer, a signal is sent by said building unit to initiate transmission of said meter relay pulse state and counter count by an address-selected meter unit.

4. The system as set forth in claim 1 further comprising an end-of-interval channel input at said meter unit and an end-of-interval output at said building unit.

5. The system as set forth in claim 1 wherein said first and second radios are spread spectrum radios.

6. The system as set forth in claim 1 wherein said first and second radios are frequency-hopping radios.

7. The system as set forth in claim 1 wherein said pulse generator further comprises:

a previous channel pulse count memory for storing a meter pulse count value received in a previous transmission from said meter unit;

a most recent channel pulse count memory for storing a meter pulse count value received in a recent transmission from said meter unit; and a pulse memory comparator for subtracting the value in the previous channel pulse count memory from the value in the most recent channel pulse count memory to yield a "catch-up" pulse count to be generated by said pulse generator.

8. The system as set forth in claim 1 wherein said meter unit further comprises an electric power consumption meter.

* * * * *